United States Patent [19]

Petrucelli et al.

[11] Patent Number: 4,975,889
[45] Date of Patent: Dec. 4, 1990

[54] ACOUSTIC RANGING APPARATUS AND METHOD

[76] Inventors: Steven P. Petrucelli, 26 N. Main St., Cranbury, N.J. 08512; Stephen A. Orbine, III, P.O. Box 544, Far Hills, N.J. 07931

[21] Appl. No.: 207,744

[22] Filed: Jun. 16, 1988

[51] Int. Cl.$^5$ .............................................. G01S 15/00
[52] U.S. Cl. ...................................... 367/98; 367/99; 367/900
[58] Field of Search .......................... 367/98, 900, 99; 73/900, 609; 364/517

[56] References Cited

U.S. PATENT DOCUMENTS

| | | | |
|---|---|---|---|
| 3,964,297 | 6/1976 | Jorgenson et al. | 73/609 |
| 4,000,650 | 1/1977 | Snyder | 73/290 V |
| 4,023,168 | 5/1977 | Bruder et al. | 342/61 |
| 4,079,376 | 5/1978 | Kirk, Jr. | 342/93 |
| 4,145,741 | 3/1979 | Nappin | 364/571.05 |
| 4,169,263 | 9/1979 | Hooker, Jr. | 342/92 |
| 4,197,528 | 4/1980 | Gibson | 367/93 |
| 4,315,325 | 2/1982 | Blades | 367/98 |
| 4,451,909 | 5/1984 | Kodera et al. | 367/99 |
| 4,464,738 | 8/1984 | Czajkowski | 367/97 |
| 4,644,513 | 2/1987 | Czajkowski | 367/108 |
| 4,675,854 | 6/1987 | Lau | 367/908 |
| 4,706,227 | 11/1987 | DuVall et al. | 367/96 |
| 4,731,762 | 5/1988 | Hanks | 367/108 |

OTHER PUBLICATIONS

Urick, Principles of Underwater Sound, 1983, p. 103.
Van Valkenburg, Network Analysis, 1985, p. 226.
Webster's Ninth New Collegiate Dictionary, 1985, p. 488.
Biber et al., "The Polaroid Ultrasonic Ranging System", presented at the Convention of the AES, 1980.

*Primary Examiner*—Thomas H. Tarcza
*Assistant Examiner*—Daniel T. Pihulic
*Attorney, Agent, or Firm*—Eugene S. Indyk

[57] ABSTRACT

An acoustic ranging apparatus directs a burst of acoustic energy toward an acoustically reflective target object. The time it takes for an echo to return to the ranging apparatus is measured to determine the distance between the ranging apparatus and the object. The echo is received, amplified, and compared with a threshold voltage which decays in time in a manner which simulates the attenuation of acoustic energy as a function of distance travelled in the medium. The attenuation function is substantially simulated over the distance range that the ranging apparatus is intended to accurately measure by means of a simple, low cost first order linear circuit. The ranging apparatus responds only to echoes having a magnitude which exceeds the threshold voltage. Spurious or false echoes, such as those due to reflection of acoustic energy in the side lobes produced by an acoustic energy transducer in the ranging apparatus, are ignored.

5 Claims, 4 Drawing Sheets

ACOUSTIC RANGING APPARATUS AND METHOD

FIELD OF THE INVENTION

This invention relates to acoustic ranging. More particularly, this invention relates to an acoustic ranging apparatus and method which is inexpensive, which is capable of accurately indicating distance, and which is capable of discriminating between true and false indications of distance.

BACKGROUND OF THE INVENTION

One approach to measuring the distance between two points, without the disadvantages of using mechanical measuring instruments such as tape measures, is to use an acoustic ranging apparatus. In one example, this ranging apparatus involves directing a burst of acoustic energy, such as ultrasonic energy, from a source to an acoustic energy receiver and measuring the time it takes for the energy to traverse the distance between the source and the receiver. In another example of an acoustic ranging apparatus, the distance between a source and an acoustically reflective object may be measured by directing a burst of acoustic energy from the source toward the object. The total time it takes for the burst to traverse the distance between the source and the object and for a reflection of that burst from the object (an echo) to travel to a receiver at a predetermined point fixed with respect to the source is measured. The receiving point may be at the source itself in a situation where the transducer which produces the burst is also the receiver which detects the echo. The receiver also may be separate from the the transmitter at a fixed known position with respect to the source. In both instances, the distance may be deduced from the time measurement, the known speed of sound in the medium in which the burst has travelled, and the known relative positions of the source and receiver.

There are, however, significant problems which must be overcome before accurate distance measurements may be made using such acoustic ranging apparatus. One of the problems is that acoustic ranging apparatus are not only sensitive to acoustic energy which has been directed toward, or reflected from, targeted objects, but they are also sensitive to various forms of spurious signals which can give erroneous distance readings. These spurious signals may be due to stray reflections from other objects in the vicinity of the source or in the vicinity of the targeted object. One of the most significant sources of such spurious signals is reflection of acoustic energy by objects positioned to intercept energy in a series of side lobes situated off the axis of the main burst of acoustic energy, which are normally produced by the available acoustic energy transducers. Spurious signals may also be due to other acoustic energy sources in the measuring environment or to noise produced by the electronics in the ranging apparatus. These spurious signal sources produce false echoes in the ranging apparatus which are not accurate indications of the distance that the ranging apparatus is attempting to measure. Discrimination circuitry must, therefore, be included in the ranging apparatus to discriminate between true and false echoes. In its simplest form, this usually is a circuit producing a fixed threshold signal related to the noise level and a means for comparing the fixed threshold to the received signals. Those signals which are true echoes are above the threshold and are processed as such. Those signals which are below the threshold are ignored.

This type of an arrangement is subject to an additional complication due to the fact that acoustic energy becomes attenuated with distance travelled in the medium. This attenuation is caused by two factors. First, the acoustic energy is attenuated because it spreads in space as it travels away from the source. This attenuation is related to the inverse of the fourth power of the distance to a reflective object in a system where acoustic energy is reflected from that object and returned to the source. Second, the energy is attenuated even further because the medium through which the acoustic energy travels, usually air or water, is a lossy medium. This attenuation is generally an exponential function of distance travelled through the medium. The circuitry in the ranging apparatus must compensate for this attenuation if it is to be equally responsive to acoustic energy that has travelled different distances in the medium and if it is to be able to distinguish between false echoes from spurious signal sources and valid echoes from target objects. This has been accomplished in the past by changing the gain of the receiver as a function of time, the change of gain having had some relationship to the attenuation of sound in the medium. In this regard, the gain was increased as a function of time to compensate in some measure the decrease in amplitude of the acoustic energy as a function of distance travelled in the medium. See, for example, U.S. Pat. Nos. 4,000,650, 4,145,741, 4,197,528, 4,451,909, 4,464,738, 4,644,513, 4,675,854, 4,706,227, and 4,731,762.

These variable gain ranging systems are afflicted with significant disadvantages. They involve relatively high current and high power circuitry making them expensive and impractical to implement. They involve changing the gain of the ranging apparatus which cannot take place instantaneously thus making it difficult to capably distinguish between true and false echoes. The components used in a variable gain ranging apparatus are usually non-linear elements which make it even more difficult to obtain accurate distance readings. Also, the rejection of spurious echoes due, for example, to side lobes produced by the acoustic energy source, was not very good in variable gain systems. This is because it is difficult to economically produce the required gain as a function of time using analog circuitry, particularly because it is a complicated and costly task to increase the gain of an analog circuit as an inverse function of the attenuation of sound in air or other similar medium. Digital circuitry has been used in an attempt to reduce the cost of increasing the gain of the ranging apparatus, but the best that can be achieved is a stepped gain function, or some other piecewise linear approximation, which cannot accurately be a reflection of the inverse of the attenuation of sound in air. In addition, digital synthesis of the required gain function and changing the gain of the ranging apparatus in accordance with that digitally synthesized function can produce transients in the circuitry of the ranging apparatus thus making it difficult to obtain accurate distance readings.

One attempt to solve at least these some of these problems involved a constant gain ranging apparatus described in U.S. Pat. No. 4,315,325. A received signal is compared with a threshold voltage from a threshold amplifier. The threshold voltage is said to decrease as a function of time in accordance with the predicted attenuation of sound in the medium. The inputs of a comparator are connected to the received signal and the threshold voltage. A positive feedback loop is established between the output of the comparator and the threshold voltage generator to periodically switch the polarity of the threshold voltage in response to the results of the comparison. This arrangement is undesirable because the positive feedback will cause the circuit to oscillate which will make it difficult, if not impossible, to obtain any useful distance information. Also, the switching of the threshold voltage will cause unwanted noise to propagate throughout the entire circuit. Furthermore, important characteristics of the threshold voltage, such as the initial value, the final value, and the time constant, are not adequately specified. The patent only states that the threshold is to be a fraction of the expected return amplitude, which would make it impossible to reject a significant number of false echoes due to spurious signal sources.

Time varying thresholds with constant gains have been tried in radar receiving circuitry, but these are not applicable in an acoustic ranging apparatus because attenuation of the signal in a radar system differs quite a bit from the attenuation of sound in an acoustic ranging apparatus. Specifically, radar signals travel through an essentially lossless medium which simplifies the problems of compensating for the attenuation of those signals. See, for example, U.S. Pat. Nos. 4,023,168, 4,079,376, and 4,169,263.

There thus has been a long felt and unsatisfied need for an acoustic ranging apparatus which avoids all of these problems and which is simple and inexpensive to manufacture. Applicants have unexpectedly satisfied this need by not only solving all of the problems of the prior approaches, but also by having done so in a manner which is relatively simple, inexpensive, and economical. Specifically, Applicants have developed a constant gain thresholding arrangement in which a first order linear circuit is used to produce a threshold signal which varies in a manner which simulates the attenuation of sound as a function of distance travelled in the medium and which is used with other circuitry to produce a simple and inexpensive ranging apparatus which is accurate and is insensitive to spurious signals from a variety of sources.

It is an object of the invention to provide a distance measuring apparatus and method which accurately determines distance between two points and is capable of discriminating between true and false indications of distance.

It is an additional object of the invention to provide an acoustic ranging apparatus and method which avoids the problems of prior acoustic ranging apparatus and methods and does so at a reasonable cost.

Other objects and advantages are either specifically described elsewhere in this application or are apparent from that description.

SUMMARY OF THE INVENTION

In one example of the invention, an acoustic ranging apparatus measures the distance between a source of acoustic energy and an acoustically reflective target object. The source produces a burst of acoustic energy along a predetermined path toward the object and measures the time it takes for the resulting echo to return to the source, which also acts as a receiver or sensor of acoustic energy. A first order linear circuit means produces a threshold signal of predetermined characteristics which simulates the attenuation of sound as a function of distance travelled through the medium. Received echoes are compared with the threshold, and when the echo exceeds the magnitude of the threshold, a signal is produced related to the distance between the object and the source of acoustic energy.

Other important features of the invention are described by way of example in the detailed description of the invention. The subject matter falling within the scope of the invention, and for which Applicants seek exclusionary rights, is specified in the claims at the end of this application.

DETAILED DESCRIPTION OF THE INVENTION

Figure 1:
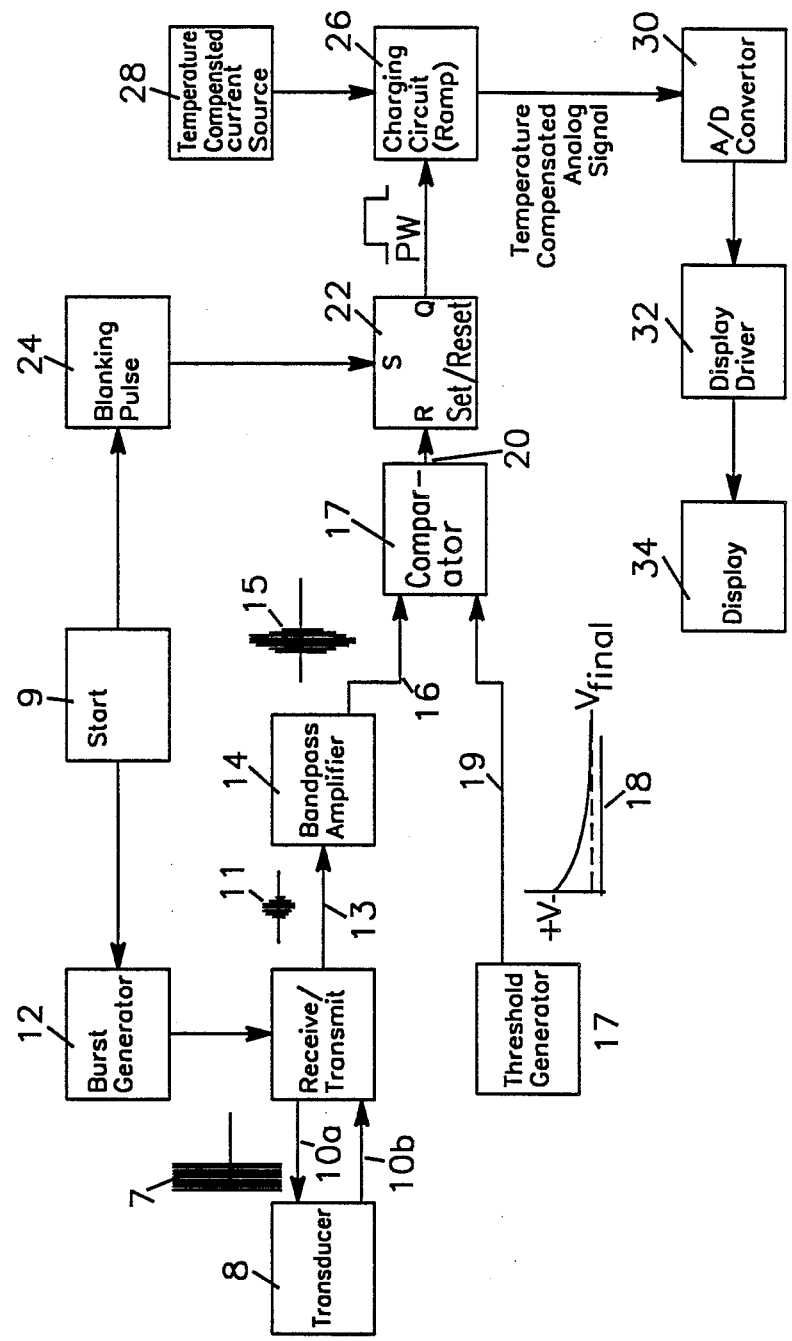
FIG. 1 is schematic diagram of one example of the invention of this application.

FIG. 1 shows a block diagram of an example of an acoustic ranging system in accordance with the invention of this application. It comprises a transmitter and receiver 10 of acoustic energy which is able to direct a narrow beam of acoustic energy in a direction indicated by arrow 10a at a predetermined frequency toward a reflective surface on a target object 8. The transmitter and receiver 10 also receives returning echoes travelling in a direction indicated by arrow 10b from the reflective surface on the object 8. The time elapsing between the point at which the energy is directed to the reflective surface and the point at which the echo is first received is measured. The distance between the receiver and transmitter 10 and the reflective surface on object 8 is derived from the measured elapsed time and the known velocity of acoustic energy in the medium between the transmitter and receiver 10 and the object 8.

A burst generator 12 is connected to the receiver and transmitter 10. The burst generator, in response to a start signal from a start signal generator 9, causes the receiver and transmitter 10 to produce a relatively short duration burst of acoustic energy 7 toward the reflective surface on object 8. The burst should have a duration of no more than about 1 millisecond, for example, it may have a duration of about 320 microseconds. The frequency of the acoustic energy may be about 50 kHz. The burst generator may be any circuit which produces a pulse having a duration the same as the desired duration of the burst. The pulse may be connected to the receiver and transmitter 10 so as to turn on an oscillator which produces a signal having a frequency the same as the desired frequency of the acoustic energy. The output produced by the oscillator may be connected to an acoustic energy transducer, such as a Polaroid Model 2701 ultrasonic transducer, which vibrates at the frequency of the oscillator and is able to direct a relatively narrow beam of acoustic energy at that frequency toward the reflective surface.

The acoustic energy transducer in the transmitter and receiver 10 is sensitive to the returning echoes coming from the reflective surface and produces an electrical output 11 related to the magnitude of those echoes. The echoes are essentially bursts of acoustic energy like those which have been transmitted, but reduced in amplitude due to the attenuation of the acoustic energy in the medium through which it has travelled. The echoes are delayed in time with respect to the transmitted burst in an amount related to the distance between the transmitter and receiver 10 and the object 8 from which they are reflected. The time between the production of the transmitted burst and the receipt of an echo from the object is measured to determine the distance between the transmitter and receiver 10 and the object 8.

The electrical output 11 is directed on an output lead 13 to a band pass amplifier 14 which has a selected gain so that it increases the magnitude of the output 11 to a desired level. The magnitude of that gain may be about 100. The pass band of the amplifier 14 is set so that it is centered on the frequency of the acoustic energy produced by the receiver and transmitter 10. The pass band should be narrow enough to reject a sufficient amount of signals and noise which have frequencies different from that of the transmitted and received acoustic energy so that these signals and noise do not affect the distance measurement. In an example where the transmitted burst of acoustic energy is 50 kHz., the pass band of the amplifier may be such that the −3 db points may be at 25 kHz. and 75 kHz. Any known band pass amplifier which provides a desired gain in the desired pass band may be used.

The output of the band pass amplifier, which is an amplified replica 15 of an echo received by the receiver and transmitter 10, is directed on line 16 to one input of a comparator 17. The comparator 17 compares the magnitude of the output of the band pass amplifier with an exponentially decreasing threshold voltage 18 produced by a threshold generator 17.

The threshold voltage has a magnitude and shape as a function of time which closely approximates or simulates the attenuation of the acoustic energy produced by the receiver and transmitter 10 as a function of distance travelled in the medium. In other words, the magnitude of the threshold voltage as a function of time, in the example of the invention shown in FIG. 1, is such that only amplified true echo signals from a target object will exceed the magnitude of the threshold signal.

The purpose of this thresholding arrangement is to prevent the ranging apparatus from responding to false echoes, which may be produced by reflections from objects other than the target object, such as reflections from objects situated off the axis extending between the transmitter and the target object. A common cause of such reflections is the reduced amplitude side lobes of acoustic energy usually produced by the available acoustic energy transducers in addition to the narrow beam of acoustic energy on the axis between the transducer and the target object. These side lobes cause reflections from objects positioned off axis which may return to the transmitter and receiver and which may be interpreted as valid echoes. A good example of such a situation is the case in which it is desired to measure, through a doorway, the distance between the receiver and transmitter 10 and a wall on the other side of the doorway. If the transmitted acoustic energy burst is directed so that it passes through the doorway toward the wall on the other side of the doorway, the acoustic energy in the side lobes may be reflected from the edges of the doorway, may be returned to the transmitter and receiver, and may be interpreted as a valid echo before the return of the reflection from the wall on the other side of the doorway. In this situation, an inaccurate indication of distance would result in that the distance to the doorway, and not the distance to the wall, would be measured. The shape and magnitude of the threshold is such that echoes of acoustic energy in the side lobes are ignored. Other false echoes are also ignored, such as secondary and later in time echoes coming from the target object and false echoes caused by electronic and acoustic noise in the circuitry of the ranging apparatus and in the surroundings of the ranging apparatus. A more detailed explanation of how the threshold voltage is produced is given below in connection with the description of FIGS. 2 and 3.

When the output of the band pass amplifier exceeds the magnitude of the threshold voltage, the output 20 of the comparator 17 changes state and resets a latch 22. The latch had been previously set by the output from a blanking pulse generator 24, which may be any known circuit which applies a blanking pulse of predetermined duration to the set input of the latch (which has priority over the reset input of the latch, as indicated in FIG. 1). The blanking pulse is first sent to the latch at the moment that the burst of acoustic energy is transmitted by the transmitter and receiver 10, as initiated by the start pulse from the start signal generator 9. The duration of the blanking pulse, for example, 2 milliseconds, is such that the the latch is set for the duration of the transmitted burst plus an amount of time to permit the ringing of the transducer to decay sufficiently. The purpose of the blanking pulse is to prevent the output of the latch from changing state in response to the transmitted burst and in response to any ringing of the transducer at the conclusion of the burst. This prevents the ranging apparatus from responding to the transmitted acoustic energy and transducer ringing as if it were a valid echo.

The output of the latch 22 is a pulse having a duration substantially equal to the elapsed time from the transmission of the burst of acoustic energy to the receipt of a valid echo from a target object. The duration of the pulse is an indication of the distance from the transducer in the receiver and transmitter 10 to the object 8 in FIG. 1. As shown in FIG. 1, the output of the latch 22 is fed to the input of a charging circuit 26, which may be any known charging circuit which charges in a substantially linear manner in response to the pulse from the latch 22 to produce an analog d.c. voltage signal. The magnitude of the output from the charging circuit will be substantially equal to the duration of the pulse from the latch 22 and thus will be directly proportional to twice the distance between the transmitter and receiver 10 and the object 8.

Charging current is supplied to the charging circuit 26 by a temperature compensated constant current source 28. The current from the source 28 is modulated in accordance with the temperature of the medium to compensate for the different velocities of sound in the medium at different temperatures. The slope of the ramp voltage in the charging circuit thus is changed so that the same output is produced by the charging circuit 26 regardless of the temperature of the medium for a given distance between the transmitter and receiver 10 and the object 8. The constant current source may be implemented in any known manner, for example, by using a current regulator, the current output of which is modulated by a temperature dependent impedance, for example, a thermistor which changes its resistance with changes in temperature to direct an appropriate current level to the charging circuit.

The analog output of the charging circuit is connected to the input of an analog to digital converter 30 which converts the analog output to a digital signal. The digital signal from the analog to digital converter 30 is fed to a display driver 32, which converts the digital signal to a signal used by a display 34 to display an indication of the measured distance between the transmitter and receiver 10 and object 8. The analog to digital converter 30, the display driver 32 and the display 34 may be any generally available circuitry which accomplishes the functions described here.

As an alternative to the current source 28 and the charging circuit 26, the output of the latch 22 may gate a clock oscillator to a counting circuit during the time between the production of the transmitted burst and the return of the echo from object 8. The count accumulated during this time is then related to the distance between the transmitter and receiver 10 and the object 8. The frequency of the clock oscillator may be changed in response to changes in temperature so that the count accurately reflects correct distance regardless of the temperature of the medium. This is a less expensive alternative than using charging circuit as described above because the need for an analog to digital converter is avoided. The count in the counter is already a digital signal which may be directly connected to an appropriate display driver.

The threshold generator is a first order linear circuit which produces an exponentially decaying threshold voltage simulating very closely the attenuation of acoustic energy in the medium between the transmitter and receiver 10 and the object 8. The attenuation of acoustic energy, however, is not simply an exponential decay as a function of distance through the medium, so that a simple first order linear circuit is not able to exactly duplicate the attenuation function at all distances from zero to infinity. Applicants have found quite surprisingly that a simple and inexpensive first order linear circuit can be tailored to produce a threshold voltage having predetermined characteristics so that the threshold voltage is a substantial replica of the attenuation function over substantial distances, especially over the range of distances that the ranging apparatus will be expected to measure. Specifically, Applicants have discovered that, if the first order linear circuit produces an exponentially decaying voltage having a predetermined starting time and magnitude and decaying in accordance with a predetermined time constant asymptotically toward a predetermined ending voltage, then the attenuation function will be approximated over a wide range of distances from the transmitter and receiver 10. Preferably, the starting voltage and magnitude, the time constant, and the ending voltage are selected to give the closest fit between the threshold voltage and the attenuation function.

Any first order linear circuit which is capable of producing an exponentially decaying voltage having a controllable start time and starting magnitude and decaying in accordance with a controllable time constant asymptotically toward a controllable ending or final voltage magnitude may be used in the invention of the application. One example would be a resistive, capacitive charging or discharging circuit containing one or more resistors having predetermined resistance values and one or more capacitors having predetermined capacitance values all connected in some manner to a switching mechanism and a voltage supply to produce the desired starting time and magnitude, a desired time constant, and a desired ending or final voltage value.

Figure 2:
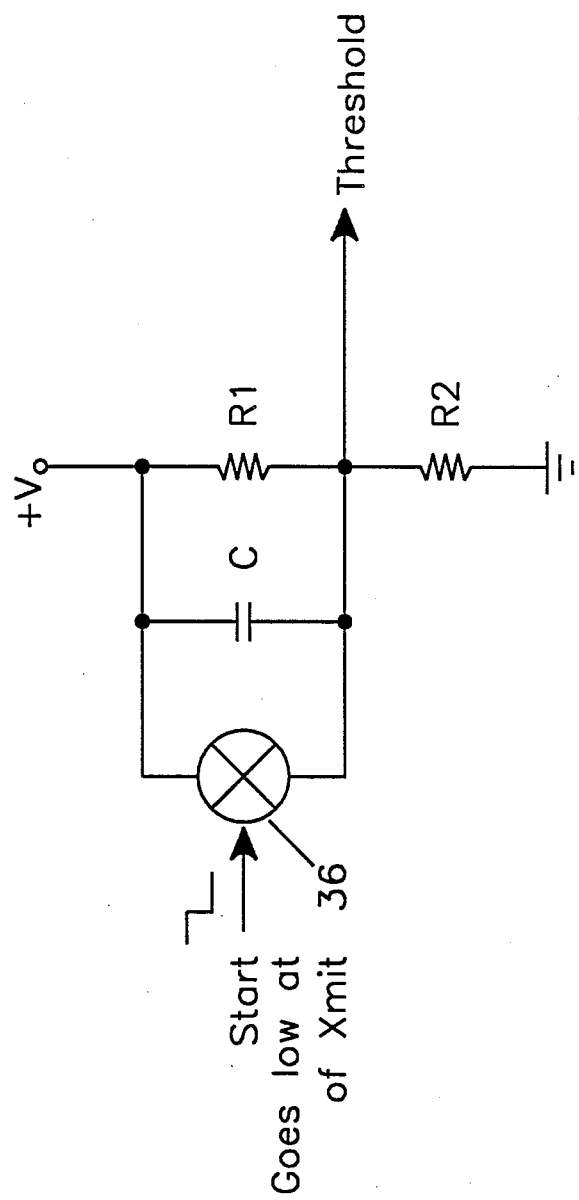
FIG. 2 is a more detailed schematic diagram of an example of the threshold generator of FIG. 1.
Figure 3:
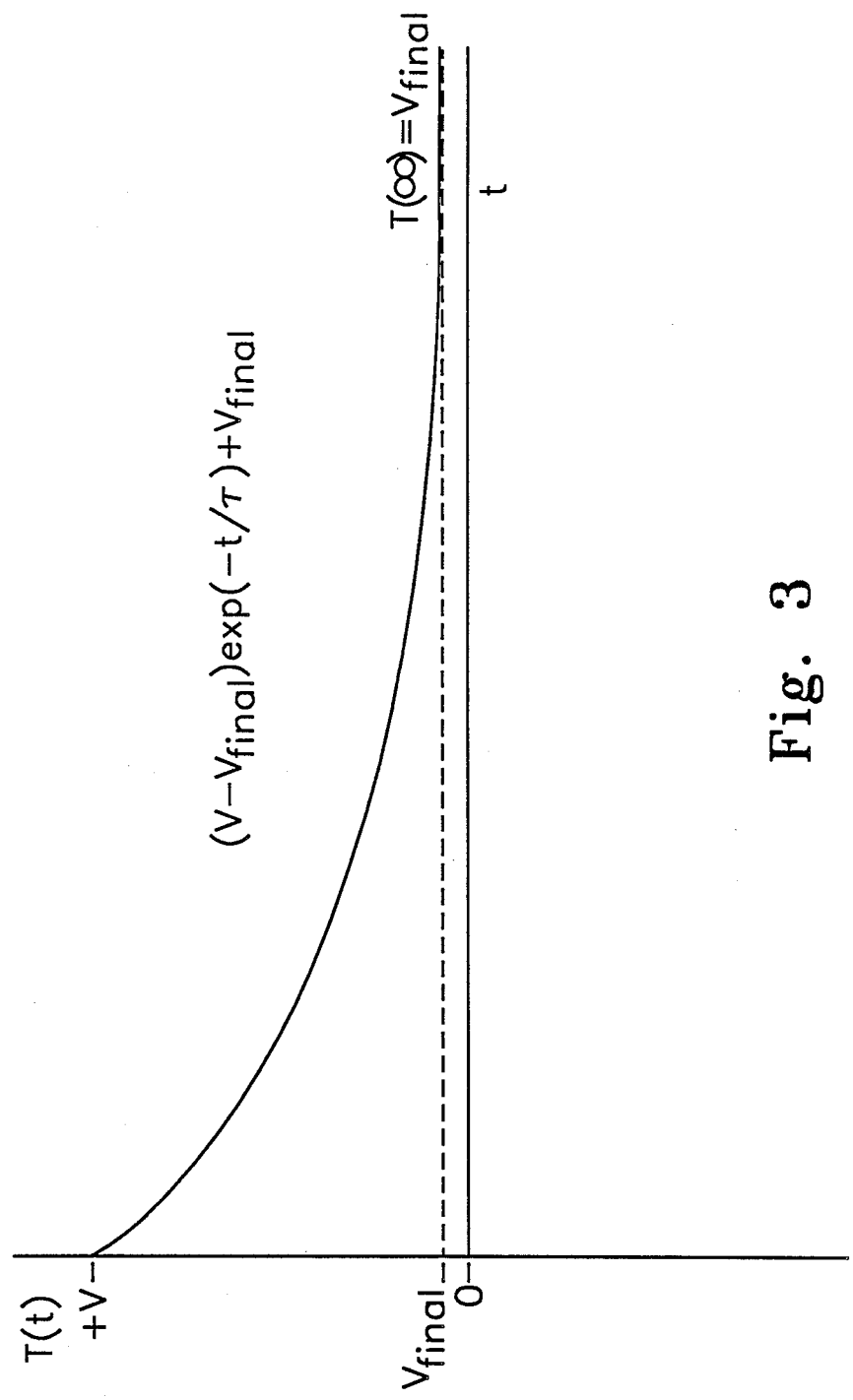
FIG. 3 shows a waveform of the threshold voltage as a function of time produced by the threshold generator of FIGS. 1 and 2.

A detailed example of such a first order linear circuit is shown in FIG. 2. The threshold voltage produced by the circuit of FIG. 2 is illustrated in FIG. 3. FIG. 2 shows a pair of resistors R1 and R2 connected in series between the positive terminal of a supply V and ground. A capacitor C is connected in parallel with the resistor R1. A means for discharging the capacitor, which may be, for example, a switch 36, is connected in parallel with the capacitor C. Prior to the production of a transmitted burst of acoustic energy, the switch is closed and the capacitor is discharged. When a start signal is produced by the start signal generator 9, the switch is opened and the capacitor begins to charge. The appropriate threshold signal is the voltage at the junction of the resistors R1 and R2 after the opening of the switch 36.

As shown in FIG. 3, the threshold voltage produced by the circuit of FIG. 2 has a starting voltage equal to the voltage of the supply V. The threshold decays to a final voltage $V_{final}$ in accordance with the following equation:

$$V_{threshold} = [(V - V_{final}) * \exp(t/\text{time constant})] + V_{final},$$

where $V_{final}$ equals $R1/(R1+R2)$ and "time constant" equals $C(R1R2)/(R1+R2)$. The voltage decrease from the starting voltage to the final voltage is less than the magnitude of the starting voltage. In other words, the final voltage is non-zero in this case. The values of the capacitor and the two resistors are selected so that the threshold voltage approximates or tracks the attenuation of acoustic energy in the medium through which the bursts of acoustic energy and the echoes are to travel. Those values are selected so that the threshold approximates or simulates that attenuation function over the distance range of the ranging apparatus. In the example of the invention shown in FIG. 1, the attenuation function which is tracked by the threshold voltage is the expected amplitude of valid amplified echoes from target objects as a function of the time between production of the transmitted burst of acoustic energy and the receipt of the valid echoes. Applicants have found that such an attenuation function in an apparatus like the one shown in FIG. 1 can be successfully approximated with a first order linear circuit substantially like the one shown in FIG. 2 over distance ranges of 0-35 feet or more.

One way that an appropriate threshold voltage may be produced is to experiment with various combinations of resistance and capacitance which result in predetermined time constants and predetermined final values for the threshold voltage. The threshold voltage produced by the circuit of FIG. 2 as a function of time is then compared with an experimentally determined function relating (1) the magnitude of each amplified valid echo coming from objects at various distances from the source to (2) the elapsed time from the production of the transmitted acoustic energy burst by the source to the receipt of each of the valid echoes. The combination of resistance and capacitance producing a threshold voltage as a function of time closest to the experimentally determined amplitudes at corresponding times, in other words, a threshold voltage which is only exceeded by amplified valid echoes, should be selected.

In specific terms, Applicants have obtained good results when the starting time for the threshold voltage occurs at the time the burst of acoustic energy is produced and directed toward the object 8. The starting magnitude of the threshold voltage in this situation is approximately the same as the magnitude of the saturation voltage of the band pass amplifier 14. The ending or final voltage toward which the threshold voltage decays is between an upper limit and a lower limit. The upper limit is the value of the expected amplitude of the amplified valid echoes appearing at the output of the band pass amplifier caused by reflections of acoustic energy from target objects at the maximum distance from the source that is to be measured by the ranging apparatus. The lower limit of the final voltage is the sum of three voltages, the voltage in the circuitry from noise sources, the d.c. input offset voltage of the band pass amplifier, and the d.c. input offset voltage of the comparator. The time constant may be selected so that the threshold voltage parallels as closely as desired the attenuation function.

Figure 4:
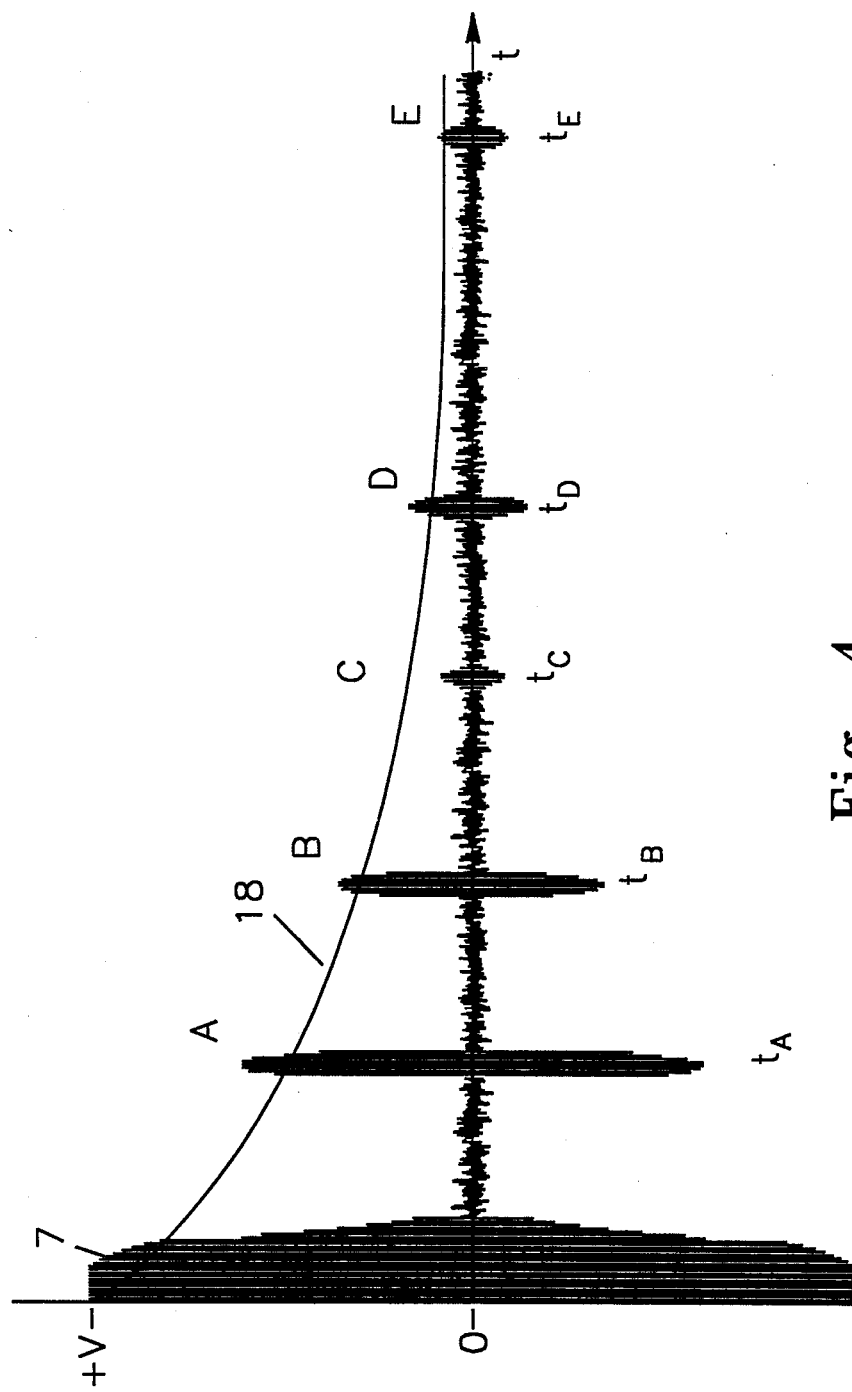
FIG. 4 shows waveforms which illustrate the relationship between the transmitted pulse, the received echoes, and the threshold voltage in the apparatus of FIGS. 1 and 2.

FIG. 4 shows a graph of a threshold voltage superimposed on amplified echoes that have returned to the receiver, which illustrates how the ranging apparatus of this invention is responsive to valid echoes and is unresponsive to false echoes. The final value of the threshold voltage is not shown in FIG. 4 to preserve clarity in the Figure. FIG. 4 does show the transmitted burst 7 in relation to the time at which echoes are received. Although the transmitted burst is many times the amplitude of any received echo, and thus exceeds the greatest magnitude of the threshold voltage, the ranging apparatus is unresponsive to the effects of the transmitted burst because of the operation of the blanking circuit described above.

FIG. 4 illustrates four valid echoes A, B, D, and E occurring at times $t_A$, $t_B$, $t_D$, and $t_E$, respectively.

Each of those times corresponds to the sum of (1) the distance that the transmitted burst from transmitter and receiver 10 had to travel in order to reach a target object 8 and (2) the distance that a respective echo from the target object 8 had to travel to return to the transmitter and receiver 10. That distance can be ascertained by measuring those time periods. As is evident from FIG. 4, the later in time an echo is received after the burst 7 is transmitted, the smaller is its amplitude. Specifically, the echo amplitude decreases in accordance with an attenuation function as mentioned above. The threshold voltage produced by the first order linear circuit in accordance with the invention of this application also decreases in accordance with that attenuation function so that only valid echoes exceed the threshold voltage and are recognized. FIG. 4 also shows a false echo C, due to perhaps a reflection of side lobe acoustic energy from an object off the axis of the beam of acoustic energy, such as a doorway between a target object 8 and the transmitter and receiver 10. The magnitude of the echo C is not sufficient to exceed the threshold and the ranging apparatus thus ignores that echo. The magnitudes of valid echoes A, B, D, and E are just sufficient to exceed the threshold. The ranging apparatus thus is responsive only to those valid echoes, and not to false echoes which are generally smaller in magnitude than the valid echoes that would be received at the same time the false echoes are received.

FIG. 4 is actually very simplified in terms of the number of false echoes that are received during an actual measurement procedure. In a situation where a single transmitted burst of acoustic energy is directed toward a target object, it is not unusual to find that many more than one false echo is produced, for example due to reflections from other objects in the measurement environment, such as side lobe reflections mentioned above, or perhaps due to unwanted secondary and later in time reflections from the target object (caused by multiple back and forth reflections of acoustic energy between the transmitter and the receiver). The apparatus of this invention is capable of distinguishing true echoes from all such false echoes.

It is clear that acoustic ranging apparatus in accordance with this invention are able to accurately distinguish between valid and invalid echoes. They are able to accurately measure the distance between an acoustic energy transmitter and a reflective object. They are able to do this in a manner which less expensive than any other prior acoustic ranging apparatus.

In support of this proposition, Applicants have designed a commercially successful embodiment of the invention which is incorporated in the International Consumer Brands' Houseworks Digitape TLM-70N ranging apparatus and in Stanley's Estimator Ultrasonic Measuring Tool, Model 39-030, both of which were placed on sale and first used in public less than one year prior to the filing date of this application. The characteristics of the threshold voltage used in these apparatus are as follows. The start voltage is 3 volts with respect to common, the decay time constant is 11 milliseconds, and the final voltage is 50 millivolts with respect to common. The threshold voltage has a start time coinciding with the transmission of the acoustic energy burst. The gain of the band pass amplifier is about 80 (about 38 db). These apparatus contain examples of the blocks shown in FIG. 1.

We claim:

1. An acoustic ranging apparatus, comprising:
    a means for producing a burst of acoustic energy along a predetermined path toward an object located a distance away from the ranging apparatus, the magnitude of the burst of acoustic energy decreasing as a function of distance from the ranging apparatus;
    a means responsive to acoustic energy for producing an electrical signal related to the magnitude of acoustic energy falling on the acoustic energy responsive means;
    a first order linear circuit means comprising a complex impedance means for producing a threshold signal which has a predetermined starting magnitude at a predetermined starting time with respect to the produced burst, the threshold signal decaying as a function of time in accordance with a predetermined time constant from the starting magnitude asymptotically toward a predetermined final magnitude, in which the predetermined starting magnitude, the predetermined starting time, the predetermined time constant, and the predetermined final magnitude are such that the threshold signal decreases in a manner which simulates the decrease in the magnitude of the burst of acoustic energy as a function of distance from the ranging apparatus;
    a means for comparing the electrical signal from the acoustic energy responsive means with the threshold signal and producing an electrical output signal based on the comparison, the threshold signal being independent of the output signal;

a means responsive to the output of the comparing means for producing a signal related to the distance of the object from the ranging apparatus; and an amplifier means for increasing the magnitude of the electrical output of the acoustic energy response means;

the final value of the threshold voltage being between (a) the magnitude of the smallest expected output of the amplifier means and (b) the sum of the amplitudes of a noise signal in the ranging apparatus and the d.c. offsets in the amplifier means and the comparing means;

in which the threshold voltage starts at the time the burst of acoustic energy is produced and at a starting magnitude which is substantially equal to a saturation voltage of the amplifier means.

2. The apparatus of claim 1, in which the time constant is such that the threshold voltage fits an attenuation function which relates the attenuation of the acoustic energy burst to distance from the ranging apparatus.

3. The apparatus of claim 1, in which the first order linear circuit means comprises an RC complex impedance means of predetermined characteristics which controls the time constant and the final value.

4. The apparatus of claim 1, in which the decay from the starting magnitude to the final magnitude is less than the starting magnitude.

5. The apparatus of claim 1, in which final magnitude is non-zero.

* * * * *